(12) United States Patent
Nomura (10) Patent No.: US 9,963,103 B2
(45) Date of Patent: May 8, 2018

(54) VEHICLE POP-UP HOOD DEVICE

(71) Applicant: TOYOTA JIDOSHA KABUSHIKI KAISHA, Toyota-shi, Aichi-ken (JP)

(72) Inventor: Masayuki Nomura, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days. days.

(21) Appl. No.: 15/106,970

(22) PCT Filed: Nov. 4, 2014

(86) PCT No.: PCT/JP2014/079276
§ 371 (c)(1),
(2) Date: Jun. 21, 2016

(87) PCT Pub. No.: WO2015/098296
PCT Pub. Date: Jul. 2, 2015

(65) Prior Publication Data
US 2017/0036642 A1 Feb. 9, 2017

(30) Foreign Application Priority Data
Dec. 25, 2013 (JP) .................................. 2013-267550

(51) Int. Cl.
*B60R 21/38* (2011.01)
*B62D 25/12* (2006.01)
(Continued)

(52) U.S. Cl.
CPC ............ *B60R 21/38* (2013.01); *B62D 25/105* (2013.01); *B62D 25/12* (2013.01); *E05B 77/08* (2013.01); *E05B 83/24* (2013.01); *E05F 15/50* (2015.01)

(58) Field of Classification Search
CPC ......... B60R 21/38; B62D 25/12; E05F 15/50; E05B 77/08; E05B 83/24
See application file for complete search history.

(56) References Cited

U.S. PATENT DOCUMENTS 6,581,987 B1 * 6/2003 Gentile .................... E05B 83/24
292/216
7,195,090 B2 * 3/2007 Parks ...................... B60R 21/38
180/271
(Continued)

FOREIGN PATENT DOCUMENTS

DE   10343106 A1 * 10/2004 ............. B60R 21/38
DE   10343106 A1   10/2004
(Continued)

OTHER PUBLICATIONS

Nov. 24, 2016 Search Report issued in European Patent Application No. 14875701.6.

*Primary Examiner* — Faye M Fleming
(74) *Attorney, Agent, or Firm* — Oliff PLC (57) ABSTRACT

A vehicle pop-up hood device includes a pair of actuators that move a front hood from a closed position to a lifted position, and a single hood lock device that is disposed at a vehicle width direction intermediate portion between the pair of actuators, that includes an anchor recess to which a hood striker is anchored, and a latch, and that is configured so as to be capable of moving from the closed position to the lifted position together with the front hood. The vehicle pop-up hood device further includes a fixing device that fixes the hood lock device in the closed position; and a fixing release device that releases the fixing of the hood lock device by the fixing device in conjunction with actuation of the actuators.

10 Claims, 8 Drawing Sheets (51) Int. Cl.
*E05B 77/08* (2014.01)
*B62D 25/10* (2006.01)
*E05F 15/50* (2015.01)
*E05B 83/24* (2014.01)

(56) References Cited

U.S. PATENT DOCUMENTS

| | | | |
|---|---|---|---|
| 7,845,691 B2 * | 12/2010 | Sundararajan | B60R 21/38 |
| | | | 180/274 |
| 9,340,467 B2 * | 5/2016 | Aoyama | C06D 5/00 |
| 9,573,560 B1 * | 2/2017 | Narita | B60R 21/38 |
| 2009/0152899 A1 | 6/2009 | Scheuch et al. | |
| 2010/0244484 A1 | 9/2010 | Nakaura et al. | |

FOREIGN PATENT DOCUMENTS

| | | |
|---|---|---|
| DE | 10331047 A1 | 1/2005 |
| EP | 2096007 A1 | 9/2009 |
| JP | S51-35007 B2 | 9/1976 |
| JP | 2004-249872 A | 9/2004 |
| JP | 2004-299614 A | 10/2004 |
| JP | 2006-199179 A | 8/2006 |
| JP | 2008-149950 A | 7/2008 |
| JP | 2009-132296 A | 6/2009 |
| JP | 2010-235040 A | 10/2010 |
| JP | 2013-023148 A | 2/2013 |
| WO | 2007/031267 A1 | 3/2007 |

* cited by examiner

VEHICLE POP-UP HOOD DEVICE

TECHNICAL FIELD

The present invention relates to a vehicle pop-up hood device.

BACKGROUND ART

The specification of European Patent Application Publication No. 2096007, Japanese Patent Applications Laid-Open (JP-A) Nos. 2004-249872 and 2004-299614 describe vehicle pop-up hood devices that pop up a front end section of a front hood provided at a front section of a vehicle toward a vehicle upper side. To provide a brief outline of the technology described in these documents, the vehicle pop-up hood device described in European Patent Application No. 2096007 includes a hood lock device with an anchor recess in which a hood striker is anchored, and a base that supports the hood lock device so as to be capable of swinging. The front hood can be popped up by actuating an actuator attached to the base, and swinging the hood lock device with respect to the base. The vehicle pop-up hood device described in JP-A No. 2004-249872 includes a pair of lock strikers disposed at a separation to each other in the vehicle width direction at an upper portion of a radiator support, and a pair of actuators that move the pair of lock strikers toward the vehicle upper side. The lock strikers are capable of moving (popping up) the front end section of the front hood toward the vehicle upper side by respectively actuating the pair of actuators. The vehicle pop-up hood device described in JP-A No. 2004-299614 includes a pair of link mechanisms disposed at a separation to each other in the vehicle width direction at a lower side of a front end section of a front hood. The link mechanisms are capable of moving (popping up) the front hood toward the vehicle upper side when actuated by an actuator.

SUMMARY OF INVENTION

Technical Problem

However, it is conceivable that in a configuration in which the front hood is retained by a single hood lock device, the front hood could tilt when a pedestrian or the like contacts the popped up front hood. Accordingly, raising the rigidity of the front hood, or providing a pair of hood lock devices (lock strikers) or a pair of link mechanisms disposed at a separation to each other in the vehicle width direction, such as in the configurations described in JP-A Nos. 2004-249872 and 2004-299614, may be considered. However, such configuration increases both the weight and the number of components.

In consideration of the above circumstances, an object of the present invention is to obtain a vehicle pop-up hood device capable of suppressing tilting of a front hood when a pedestrian or the like contacts the popped up front hood, and that is capable of suppressing increases in the weight and the number of components.

Solution to Problem

A vehicle pop-up hood device according to a first aspect includes: a pair of front hood lifting devices that are disposed at a separation to each other in a vehicle width direction at a vehicle lower side of a front end section of a front hood, the pair of front hood lifting devices being actuated to move the front hood from a closed position to a lifted position; a single hood lock device that is disposed at a vehicle width direction intermediate portion between the pair of front hood lifting devices, the hood lock device including a hood lock device body including an anchored-to portion to which a hood striker attached to the front hood is anchored, and a lock portion that retains the hood striker in a state anchored to the anchored-to portion, and a lock base that supports the hood lock device body, and wherein the hood lock device body is configured capable of moving from the closed position to the lifted position together with the front hood; a fixing device that fixes the hood lock device body to the lock base; and a fixing release device that, in conjunction with actuation of the front hood lifting devices, releases the fixing of the hood lock device body to the lock base by the fixing device.

In the vehicle pop-up hood device according to the first aspect, in a state prior to actuation of the front hood lifting devices, the hood lock device body is fixed to the lock base by the fixing device. The hood striker attached to the front hood is anchored to the anchored-to portion of the hood lock device body, and the hood striker is retained in a state anchored to the anchored-to portion by the lock portion, thereby retaining the front hood in the closed position. In the vehicle pop-up hood device, the fixing of the hood lock device body to the lock base by the fixing device is released in conjunction with actuation of the front hood lifting devices. With the hood striker still retained in an anchored state to the anchored-to portion, the hood lock device body accordingly moves from the closed position to the lifted position together with the front hood, namely, the front hood is popped up. Note that the vehicle pop-up hood device has a structure in which the front hood is popped up by the pair of front hood lifting devices disposed at a separation to each other in the vehicle width direction, thereby enabling tilting of the front hood to be suppressed when a pedestrian or the like contacts the popped up front hood. Moreover, employing a structure in which the front hood is retained by the single hood lock device enables increases in weight and in the number of components to be suppressed.

A vehicle pop-up hood device according to a second aspect is the vehicle pop-up hood device according to the first aspect, wherein the hood lock device body is configured capable of moving from the closed position to the lifted position by swinging about a specific axis.

In the vehicle pop-up hood device according to the second aspect, the hood lock device body can be made to follow movement of the front hood by the simple configuration of swinging the hood lock device body about the specific axis.

A vehicle pop-up hood device according to a third aspect is the vehicle pop-up hood device according to the first aspect, wherein the hood lock device body is configured capable of moving from the closed position to the lifted position by sliding along a guide portion.

In the vehicle pop-up hood device according to the third aspect, the hood lock device body can be made to follow movement of the front hood by the simple configuration of sliding the hood lock device along the guide portion.

A vehicle pop-up hood device according to a fourth aspect is the vehicle pop-up hood device according to the third aspect, wherein the guide portion includes a guide groove or a guide hole formed in an elongated hole shape, with which a portion of the hood lock device body engages, and the portion of the hood lock device body moves along the guide groove or the guide hole.

In the vehicle pop-up hood device according to the fourth aspect, the hood lock device body can be made to follow movement of the front hood by the simple configuration of sliding the hood lock device body along the guide groove or the guide hole.

A vehicle pop-up hood device according to a fifth aspect is the vehicle pop-up hood device according to the fourth aspect, wherein the hood lock device body includes a guide tab respectively extending toward a vehicle width direction right side and a vehicle width direction left side, the hood lock device body is inserted into the lock base that is formed in a tube shape and that includes the guide groove inside which the guide tab is disposed, and a clearance is provided between the hood lock device body and the lock base.

A vehicle pop-up hood device according to a sixth aspect is the vehicle pop-up hood device according to the fourth aspect, wherein the hood lock device body includes a pair of guide pins disposed at a separation to each other in the vehicle width direction, the hood lock device body is inserted into the lock base that is formed in a lube shape and that includes the guide hole inside which the guide pins are disposed, and a clearance is provided between the hood lock device body and the lock base.

In the vehicle pop-up hood device according to the fifth aspect or the sixth aspect, the hood lock device body can be made to follow movement of the front hood by the simple configuration of sliding the hood lock device body along the guide groove or the guide bole provided to the lock base. Moreover, an increase in friction due to the hood lock device body and the lock base sliding against each other can be suppressed by providing a clearance between the hood lock device body and the lock base.

A vehicle pop-up hood device according to a seventh aspect is the vehicle pop-up hood device according to any one of the first aspect to the sixth aspect, wherein the fixing release device is configured including a cable with one end coupled to the fixing device, and a link mechanism that actuates in conjunction with actuation of the front hood lifting devices and to which another end of the cable is coupled, and the cable is configured so as not to be pulled by more than a specific stroke length by the link mechanism.

In the vehicle pop-up hood device according to the seventh aspect, providing the link mechanism described above enables excessive pulling of the cable to be suppressed, thereby enabling a stable operation amount to be input to the fixing device due to the fixing device being pulled by the cable.

A vehicle pop-up hood device according to an eighth aspect is the vehicle pop-up hood device according to the seventh aspect, wherein the link mechanism includes a link piece that is supported so as to be capable of swinging, and to which the other end of the cable is coupled, and a portion of the front hood lifting devices that moves toward a vehicle upper side presses a portion of the link piece so as to swing the link piece and pull the cable.

The vehicle pop-up hood device according to the eighth aspect enables the cable to be pulled due to the portion of the front hood lifting devices pressing and swinging the portion of the link piece. Moreover, limiting the swing angle of the link piece enables the operation amount input to the fixing device to be limited.

A vehicle pop-up hood device according to a ninth aspect is the vehicle pop-up hood device according to the eighth aspect, wherein, when the portion of the front hood lifting devices has moved a specific distance toward the vehicle upper side, the portion of the front hood lifting devices separates from the link piece.

In the vehicle pop-up hood device according to the ninth aspect, after the portion of the front hood lifting device rotates the link piece, the portion of the front hood lifting devices separates from the link piece, thereby enabling a rotation angle of the link piece to be limited. This thereby enables the operation amount input to the fixing device to be limited.

A vehicle pop-up hood device according to a tenth aspect is the vehicle pop-up hood device according to any one of the first aspect to the ninth aspect, wherein in a state in which the front hood is positioned at the closed position, the front hood and the pair of front hood lifting devices are separated from each other, and the fixing of the hood lock device body to the lock base by the fixing device is released before the, front hood lifting devices contact the front hood.

In the vehicle pop-up hood device according to the tenth aspect, the fixing of the hood lock device body to the lock base by the fixing device is released before the front hood lifting devices contact the front hood. This thereby enables the front hood to be popped up smoothly.

A vehicle pop-up hood device according to an eleventh aspect is the vehicle pop-up hood device according to any one of the first aspect to the tenth aspect, wherein an auxiliary lever is attached to the hood lock device body to suppress unintentional opening of the front hood by anchoring an auxiliary hook provided to the front hood.

In the vehicle pop-up hood device according to the eleventh aspect, the front hood can be opened by operating the auxiliary lever even in a state in which the front hood has been popped up. This thereby enables an operation to replace front hood lifting devices or the like to he performed easily after the front hood has been popped up.

A vehicle pop-up hood device according to a twelfth aspect is the vehicle pop-up hood device according any one of the first aspect to the eleventh aspect, wherein the front hood lifting devices are each configured by an actuator of a type in which a cylinder section inside which a pipe section is disposed moves toward a vehicle upper side with respect to the pipe section, or by an actuator of a type in which a rod section inserted into a cylinder section moves toward the vehicle upper side with respect to the cylinder section.

In the vehicle pop-up hood device according to the twelfth aspect, the two types of actuator described above may be selected as appropriate, thereby enabling easy adjustment of the bending rigidity of the actuators after completing actuation.

Effects of Invention

The vehicle pop-up hood device according to the present invention exhibits the excellent effect of enabling tilting of a front hood when a pedestrian or the like contacts the popped up front hood to be suppressed, and enabling increases in the weight and the number of components to be suppressed.

BRIEF DESCRIPTION OF DRAWINGS

FIG. 7B is a cross-section illustrating a cross-section of the members including the hood lock device, taken along line 7B-7B illustrated in FIG. 7A.

DESCRIPTION OF EMBODIMENTS

Explanation follows regarding a vehicle pop-up hood device according to an exemplary embodiment of the present invention, with reference to FIG. 1 to FIG. 5. In the respective drawings, the arrow FR, the arrow UP, and the arrow OUT respectively indicate the front direction (direction of progress), upward direction, and vehicle width direction outside direction of the vehicle. In the following explanation, unless specifically stated, reference simply to the front and rear, left and right, and up and down directions indicates the front and rear in a vehicle front-rear direction, left and right in a vehicle left-right direction (vehicle width direction), and upward and downward in a vehicle up-down direction.

Figure 1:
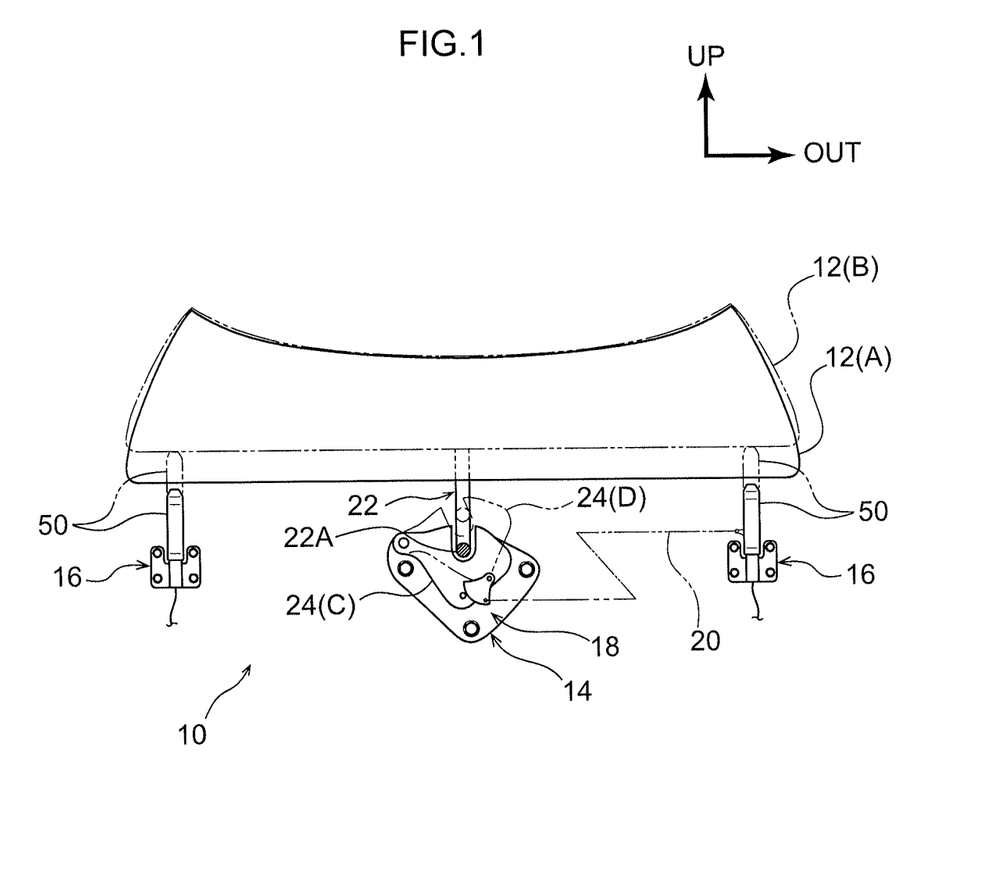
FIG. 1 is a front view schematically illustrating a vehicle pop-up hood device of an exemplary embodiment.
Figure 2:
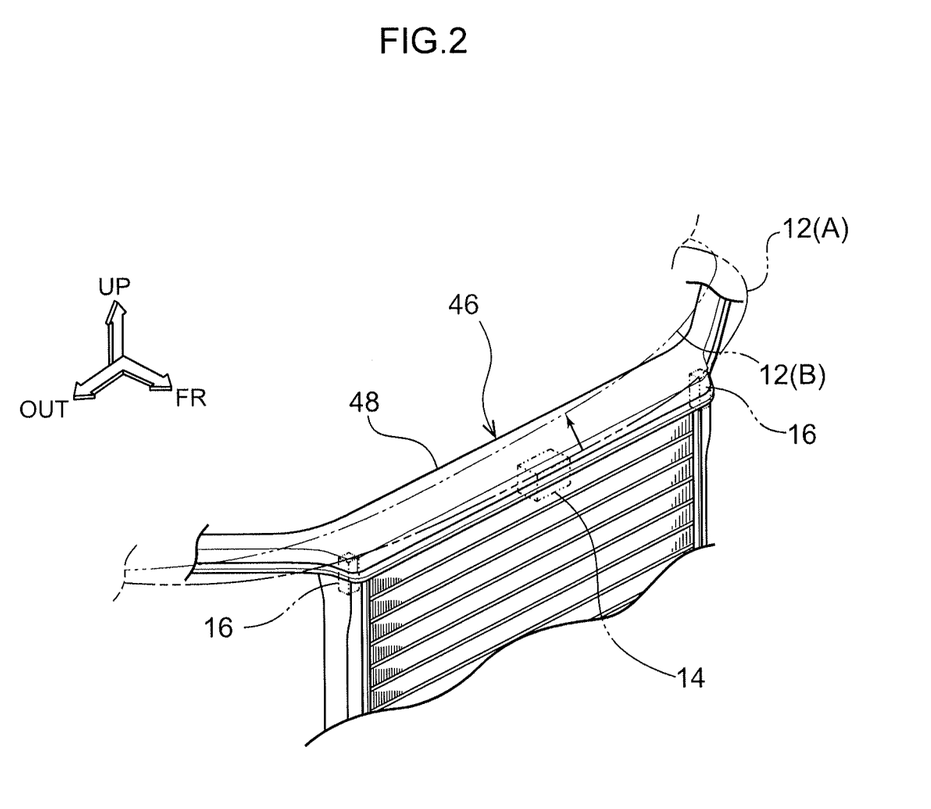
FIG. 2 is a perspective view schematically illustrating a front section of a vehicle provided with the vehicle pop-up hood device illustrated in FIG. 1.

As illustrated in FIG. 1 and FIG. 2, a vehicle pop-up hood device 10 of the present exemplary embodiment includes a hood lock device 14 that retains a front hood 12 from a closed position (the state indicated by the letter A) as far as a lifted position (the state indicated by the letter B). The vehicle pop-up hood device 10 further includes a pair of left and right actuators 16, serving as front hood lifting devices that move the front hood 12 from the closed position to the lifted position on actuation. The vehicle pop-up hood device 10 further includes a fixing device 18 that fixes the hood lock device 14 in the closed position (the state indicated by the letter C), and a fixing release device 20 that releases the fixing of the hood lock device 14 by the fixing device 18, linked to actuation of the actuators 16. First, explanation follows regarding schematic configuration of the front hood 12, followed by explanation regarding the hood lock device 14, the actuators 16, the fixing device 18, and the fixing release device 20.

Configuration of Front Hood 12

As illustrated in FIG. 2, the front hood 12 extends in the vehicle front-rear direction and the vehicle width direction, and is formed in a substantially rectangular shape in plan view of the vehicle. The front hood 12 covers a power unit room in which a power unit, not illustrated in the drawings, is housed, from a vehicle upper side. A rear end section of the front hood 12 is supported by a pair of hood hinges (not illustrated in the drawings) respectively disposed on the left and right, so as to be capable of swinging. As illustrated in FIG. 1, a hood striker 22 is provided at a vehicle width direction intermediate portion of a front end section of the front hood 12 (see FIG. 1). The front hood 12 is retained in the closed position, namely, swinging of the front hood 12 is restricted, by anchoring the hood striker 22 to the single hood lock device 14 disposed at the vehicle width direction intermediate portion of the front end section of the vehicle.

As viewed from the side of the vehicle, the hood striker 22 is formed in a substantially U-shape opening toward the vehicle upper side, and a lower end portion of the hood striker 22 configures an anchor portion 22A extending along the vehicle front-rear direction in a closed state of the front hood 12.

Hood Lock Device 14

Figure 3:
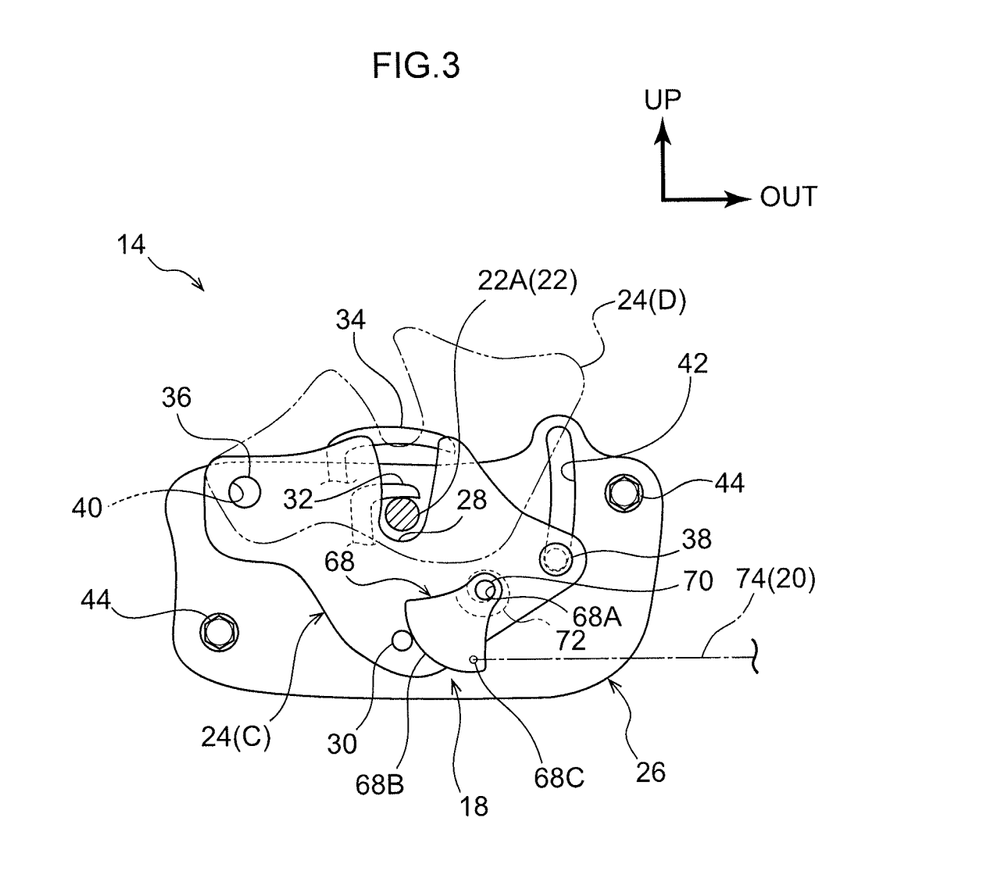
FIG. 3 is an enlarged front view illustrating a hood lock device, a hood lock device base, and a fixing device configuring part of the vehicle pop-up hood device illustrated in FIG. 1.

As illustrated in FIG. 3, the hood lock device 14 includes a hood lock device body 24, and a lock base 26 that supports the hood lock device body 24.

The hood lock device body 24 is formed in a substantially rectangular shape as viewed from the front of the vehicle, and an upper portion of the hood lock device body 24 is formed with an anchor recess 28, serving as an anchored-to portion, to which the anchor portion 22A of the hood striker 22 is anchored. The anchor recess 28 opens toward the vehicle upper side, and an edge portion of the anchor recess 28 is formed in a substantially U-shape as viewed from the front of the vehicle. The width of the anchor recess 28 is set so as to widen gradually toward the vehicle upper side.

A fixing pin 30 abutted by a fixing piece 68 of the fixing device 18, described in detail later, is joined to a lower end portion of the hood lock device body 24. The hood lock device body 24 further includes a latch 32, serving as a lock portion that retains the anchor portion 22A of the hood striker 22 at a depth direction end portion of the anchor recess 28. Retention of the anchor portion 22A by the latch 32 can be released by operating the latch 32 through a cable, not illustrated in the drawings. Moreover, an auxiliary lever 34 that suppresses unintentional opening of the front hood 12 is attached to the hood lock device body 24 by anchoring an auxiliary hook (not illustrated in the drawings) provided to the front hood 12. A support pin 36 is fixed to an end portion on the vehicle width direction right side of the hood lock device body 24, and a guide pin 38 is fixed to an end portion on the vehicle width direction left side of the hood lock device body 24. Note that the locations to which the support pin 36 and the guide pin 38 are fixed are not limited to the above, and may be set as appropriate in consideration of the swing trajectory of the hood lock device body 24 or the like.

The lock base 26 is, for example, formed by pressing sheet steel material, and the lock base 26 is formed in a rectangular plate shape extending in the vehicle width direction and with its plate thickness direction in the vehicle front-rear direction. A circular support hole 40 is formed in an end portion on the vehicle width direction right side and vehicle upper side of the lock base 26. The support pin 36 fixed to the hood lock device body 24 is inserted into the support hole 40 such that the hood lock device body 24 is capable of swinging about the support hole 40 acting as a shaft support portion. A guide hole 42 formed in the shape of a circular arc about an axial center at the center of the support hole 40 is formed in an end portion on the vehicle width direction left side of the lock base 26. The guide pin 38 fixed to the hood lock device body 24 is inserted through the guide hole 42, thereby restricting a swing range of the hood lock device body 24 with respect to the lock base 26, namely, enabling the hood lock device body 24 to swing in a range from the closed position to the lifted position (the state indicated by the letter D).

Fixing screws 44 are inserted through the lock base 26 described above, and the fixing screws 44 are screwed into screw holes, not illustrated in the drawings, formed in a vehicle front side face of the an upper member 48 (see FIG. 2) of a radiator support 46. The hood lock device 14 is thereby fixed to the upper member 48.

Actuators 16

Figure 4:
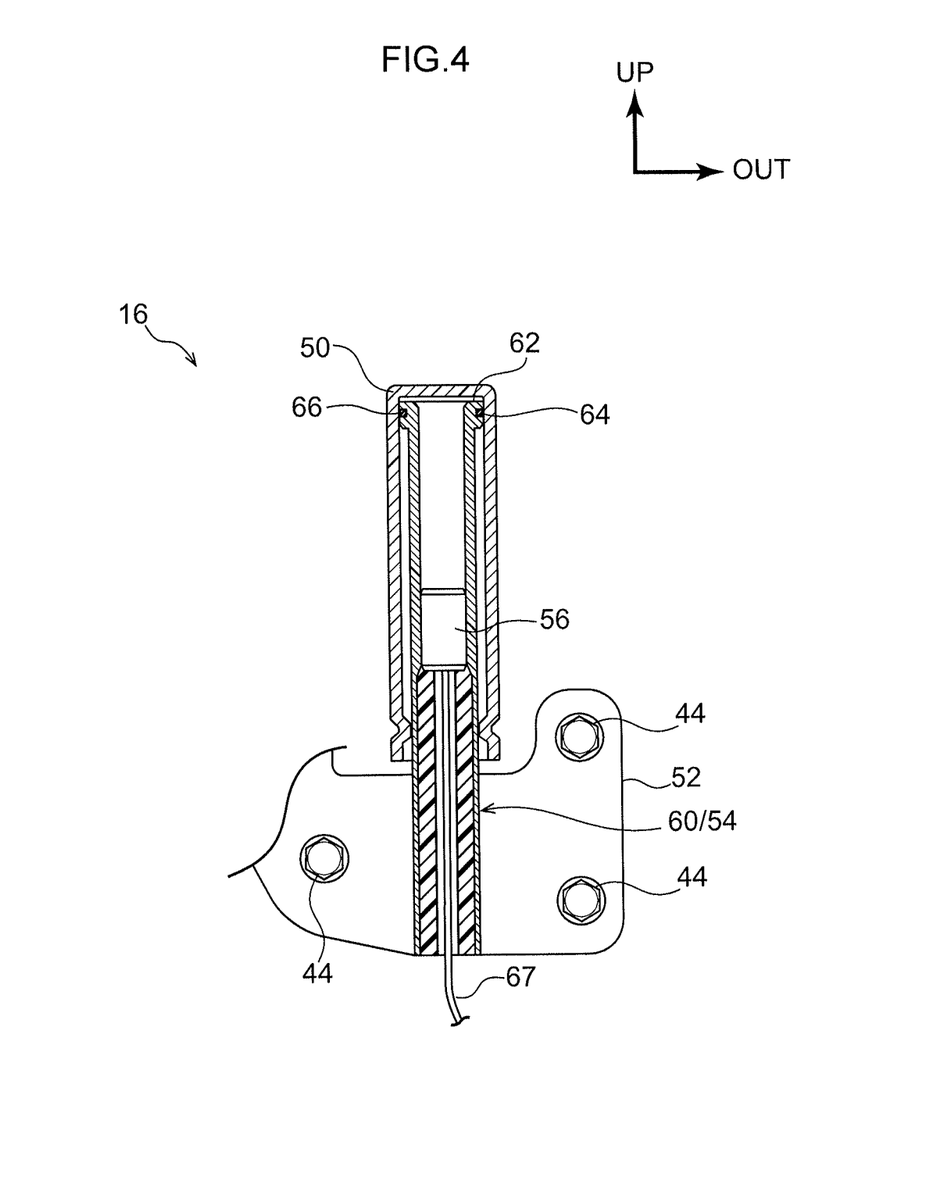
FIG. 4 is an enlarged cross-section illustrating an actuator configuring part of vehicle pop-up hood device illustrated in FIG. 1.

As illustrated in FIG. 1, the respective actuators 16 are provided on a vehicle width direction right side and left side of the hood lock device 14, and as illustrated in FIG. 4, each of the actuators 16 includes a cylinder section 50 that is formed in a bottomed cylinder shape, and a pipe section 54 that is inserted into the cylinder section 50 and that is fixed to a bracket 52 formed in a plate shape. The configuration of the actuator 16 provided on the vehicle width direction right side and the configuration of the actuator 16 provided on the vehicle width direction left side are the same as each other, and so explanation follows regarding the actuator 16 provided on the vehicle width direction left side, and explanation of the actuator 16 provided on the vehicle width direction right side is omitted.

Figure 5:
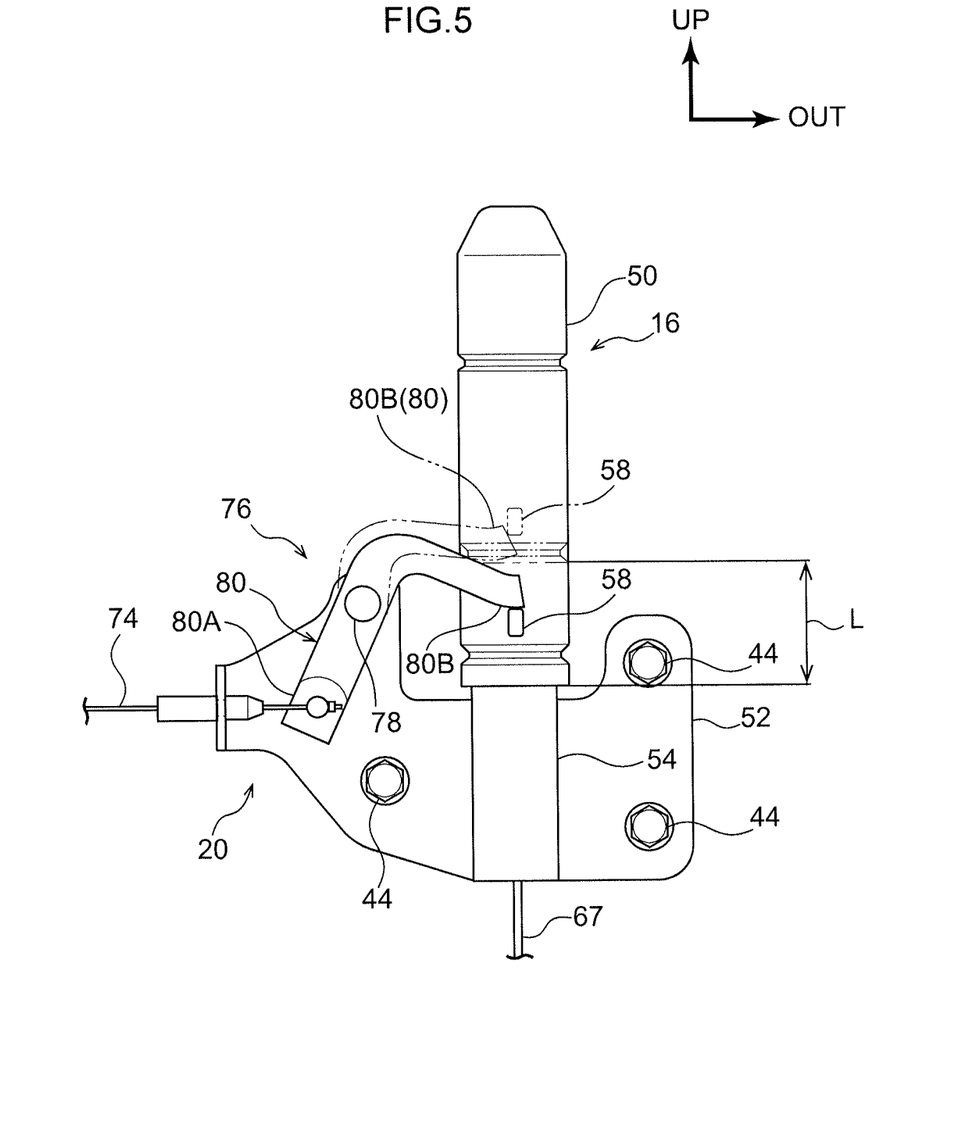
FIG. 5 is an enlarged front view illustrating an actuator and a fixing release device configuring part of the vehicle pop-up hood device illustrated in FIG. 1.

The length direction of the cylinder section 50 runs in the vehicle up-down direction, and the cylinder section 50 is formed in a cylinder shape that is closed off at an upper end. A micro-gas generator 56 (referred to below as the "MGG 56") is fixed at a length direction intermediate portion of the pipe section 54. The MGG 56 includes a gas generating agent and a squib, and the squib generates heat, causing the gas generating agent to combust, thereby increasing the pressure inside the cylinder section 50. As illustrated in FIG. 5, a protrusion portion 58 projecting out toward a radial direction outside of the cylinder section 50 is provided at an open end side of the cylinder section 50.

As illustrated in FIG. 4, the pipe section 54 includes a general portion 60 that has a smaller diameter than an internal diameter of the cylinder section 50, and a large diameter portion 62 that is provided at an upper end portion of the general portion 60 and that has a larger diameter than the external diameter of the general portion 60. The external diameter of the large diameter portion 62 is a slightly smaller external diameter than the internal diameter of the cylinder section 50, and is formed with a groove 64 extending around an outer peripheral portion of the large diameter portion 62 in the circumferential direction. An O-ring 66 is attached to the groove 64, and the O-ring 66 forms a seal between the large diameter portion 62 and the cylinder section 50. A wire harness 67 connected to the MGG 56 is laid out at a radial direction inside of the general portion 60, and the wire harness 67 leads out from a lower end of the pipe section 54 to the outside of the actuator 16. Note that the radial direction inside of the general portion 60 is filled with a resin.

Fixing screws 44 are inserted through the bracket 52 of the actuator 16 described above, and the fixing screws 44 are screwed into screw holes, not illustrated in the drawings, formed in the upper member 48 (see FIG. 2) of the radiator support 46, thereby fixing the actuator 16 to the upper member 48. Note that the locations where the actuators 16 are fixed are not limited to the above, and, for example, the actuators 16 may be fixed to the vehicle body at other locations.

As illustrated in FIG. 1, the front hood 12 and the actuators 16 are separated from each other in a state in which the front hood 12 is positioned at the closed position. The front hood 12 is configured so as to move from the closed position to the lifted position by actuating the actuators 16 such that the cylinder sections 50 rise up and upper end portions of the cylinder sections 50 contact the front hood 12, after which the cylinder sections 50 continue to rise up further. Note that locations on the front hood 12 that are contacted by the cylinder sections 50 are reinforced, for example by attaching thick plate members.

Fixing Device 18

As illustrated in FIG. 3, the fixing device 18 includes the fixing pin 30 that is fixed to the lower end portion of the hood lock device body 24, the fixing piece 68 that is formed substantially in an open fan shape as viewed from the front of the vehicle, and a support pin 70 that swingably supports the fixing piece 68, and that is fixed to the lock base 26.

The fixing piece 68 is formed in a block shape with a specific thickness in the vehicle front-rear direction. The fixing piece 68 is formed with a circular support hole 68A. The support pin 70 is inserted into the support hole 68A such that the fixing piece 68 is capable of swinging about the support pin 70.

The fixing piece 68 includes a contact face 68B that contacts the fixing pin 30. The contact face 68B is formed in the shape of a circular arc about an axial center at the center of the support pin 70 as viewed from the front of the vehicle. In a state in which the contact face 68B is in contact with the fixing pin 30, the hood lock device body 24 is fixed in the closed position, and in a state in which the fixing piece 68 has been swung such that the contact face 68B and the fixing pin 30 are not in contact with each other, the hood lock device body 24 is capable of swinging about support pin 36. Namely, the hood lock device body 24 is capable of moving from the closed position to the lifted position. Note that the hood lock device body 24 is provided with an escape portion, not illustrated in the drawings, such that the fixing piece 68 and the support pin 70 do not interfere with the hood lock device body 24 when the hood lock device body 24 swings about the support pin 36.

The fixing piece 68 is further formed with an anchor hole 68C to which one end of a cable 74, configuring part of the fixing release device 20 described in detail later, is anchored. Operation force is input to the fixing piece 68 by pulling the cable 74 inserted through the anchor hole 68C, so as to swing the fixing piece 68 about the support pin in a counterclockwise direction as viewed from the front of the vehicle. Note that a spring 72 biases the fixing piece 68 in a clockwise direction as viewed from the front of the vehicle.

Fixing Release Device 20

As illustrated in FIG. 5, the fixing release device 20 includes the cable 74 of which one end is coupled to the fixing piece 68 (see FIG. 3) of the fixing device 18, and a link mechanism 76 that actuates linked to actuation of the actuator 16, and to which the other end of the cable 74 is coupled. Specifically, the link mechanism 76 is configured by a link pin 78 that is fixed to the bracket 52, and a link piece 80 that is swingably supported by the link pin 78. One end portion of the link piece 80 configures a coupling portion 80A to which the other end of the cable 74 is coupled, and the other end portion of the link piece 80 configures a contacted portion 80B that is contacted by the protrusion portion 58 provided to the cylinder section 50 of the actuator 16.

When the cylinder section 50 moves toward the vehicle upper side due to actuation of the actuator 16, the protrusion portion 58 formed to the cylinder section 50 pushes the contacted portion 80B of the link piece 80 in the vehicle upward direction. The link piece 80 accordingly swings about the link pin 78, and the cable 74 is pulled toward the vehicle width direction outside. Accordingly, as illustrated in FIG. 3, the fixing piece 68 swings about the support pin 70, releasing the fixing of the hood lock device body 24 in the closed position.

As illustrated in FIG. 5, in the present exemplary embodiment, when the cylinder section 50 has moved toward the vehicle upper side by a specific distance L, the protrusion portion 58 formed to the cylinder section 50 and the contacted portion 80B of the link piece 80 separate from each other. Accordingly, the cable 74 is not pulled by more than a specific stroke length. Note that when the protrusion portion 58 formed to the cylinder section 50 and the contacted portion 80B of the link piece 80 separate from each other, the contact face 68B of the fixing piece 68 and the fixing pin 30 are in a state not in contact with each another.

In the present exemplary embodiment, the cylinder section 50 contacts the front hood 12 after the protrusion portion 58 formed to the cylinder section 50 and the contacted portion 80B of the link piece 80 have separated from each other. In other words, the fixing of the hood lock device body 24 by the fixing device 18 is released before the cylinder section 50 contacts the front hood 12.

Operation and Effects of the Present Exemplary Embodiment

Next, explanation follows regarding operation and effects of the present exemplary embodiment.

In a state prior to actuation of the actuators 16, as illustrated in FIG. 1, the hood lock device body 24 is fixed in the closed position by the fixing device 18, as illustrated in FIG. 3. The hood striker 22 attached to the front hood 12 is anchored to the anchor recess 28 of the hood lock device body 24, and the anchor portion 22A of the hood striker 22 is retained in a state anchored to the anchor recess 28 by the latch 32, thereby retaining the front hood 12 in the closed position.

In the present exemplary embodiment, when the actuators 16 are actuated, the fixing of the hood lock device body 24 by the fixing device 18 is released, and then the hood lock device body 24 moves from the closed position to the lifted position together with the front hood 12, with the anchor portion 22A of the hood striker 22 still retained in an anchored state inside the anchor recess 28. Namely, the front hood 12 is popped up.

The present exemplary embodiment employs a structure in which the front hood 12 is popped up by the pair of left and right actuators 16 disposed at a separation to each other in the vehicle width direction. This thereby enables the front hood 12 to be suppressed from tilting when a pedestrian or the like contacts the popped up front hood 12. Moreover, employing a structure in which the front hood 12 is retained by the single hood lock device 14 enables increases in the weight and the number of components to be suppressed.

Moreover, in the present exemplary embodiment, the hood lock device body 24 can be made to follow the movement of the front hood 12 by the simple configuration of swinging the hood lock device body 24 about the support pin 36.

In the present exemplary embodiment, as illustrated in FIG. 5, the fixing release device 20 includes the link mechanism 76 configured as described above, thereby preventing excessive pulling of the cable 74. This thereby enables a stable operation amount to be input to the fixing piece 68 due to the fixing piece 68 of the fixing device 18 being pulled by the cable 74 as illustrated in FIG. 3.

In the present exemplary embodiment, the fixing release device 20 includes the link mechanism 76 configured as described above. The fixing of the hood lock device body 24 by the fixing device 18 is accordingly released before the cylinder sections 50 of the actuators 16 contact the front hood 12. This thereby enables the front hood 12 to be popped up smoothly.

In the present exemplary embodiment, as illustrated in FIG. 3, the auxiliary lever 34 is attached to the hood lock device body 24. This thereby enables the front hood 12 to be opened by operating the auxiliary lever 34 even in a state in which the front hood 12 has been popped up. This thereby allows performing an operation to replace the actuators 16 and the front hood 12 or the like easily after the front hood 12 has been popped up.

Note that in the present exemplary embodiment, explanation has been given regarding an example in which the auxiliary lever 34 is attached to the hood lock device body 24. However, the present invention is not limited thereto, and, for example, configuration may be made in which the auxiliary lever 34 is not attached to the hood lock device body 24. Whether or not to attach the auxiliary lever 34 to the hood lock device body 24 may be decided as appropriate in consideration of, for example, the ease of an operation to replace components configuring the vehicle pop-up hood device 10 or components configuring the front section of the vehicle.

In the present exemplary embodiment, explanation has been given regarding an example in which configuration is made such that the cable 74 is not pulled by more than a specific stroke length by the link mechanism 76 described above. However, the present invention is not limited thereto. For example, configuration may be made in which the cable 74 is pulled until reaching a state in which the cylinder section 50 has completed its movement toward the vehicle upper side. Accordingly, the stroke length of the cable 74 may be set as appropriate in consideration of the configuration of the fixing device 18 and the like.

In the present exemplary embodiment, explanation has been given regarding an example in which the hood lock device body 24 is made to follow the movement of the front hood 12 by swinging the hood lock device body 24 about the support pin 36. However, the present invention is not limited thereto. For example, as in a hood lock device 82 according to a first modified example illustrated in FIG. 6A and FIG. 6B, a hood lock device body 86 may be made to follow the movement of the front hood 12 by sliding the hood lock device body 86 along guide grooves 88 serving as guide portions. Moreover, as in a hood lock device 94 according to a second modified example illustrated in FIG. 7A and FIG. 7B, a hood lock device body 98 may be made to follow the movement of the front hood 12 by sliding the hood lock device body 98 along guide holes 102 serving as guide portions.

Figure 6A:
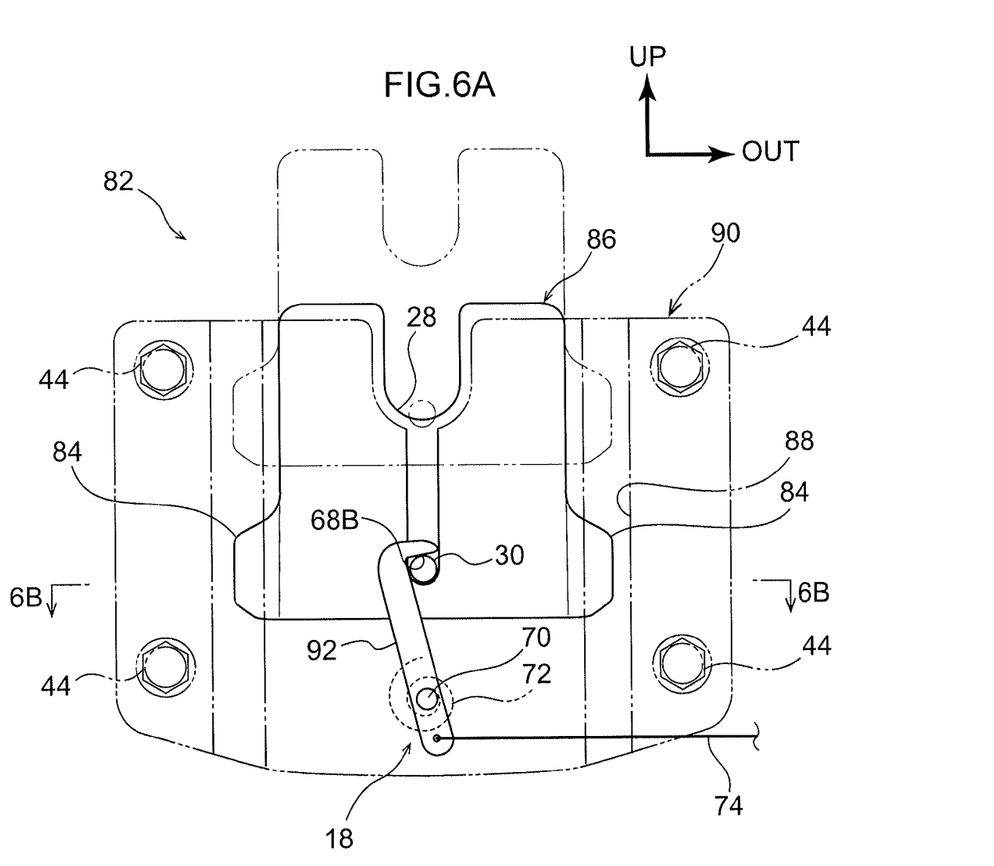
FIG. 6A is an enlarged front view illustrating members including a hood lock device according to a first modified example.
Figure 6B:
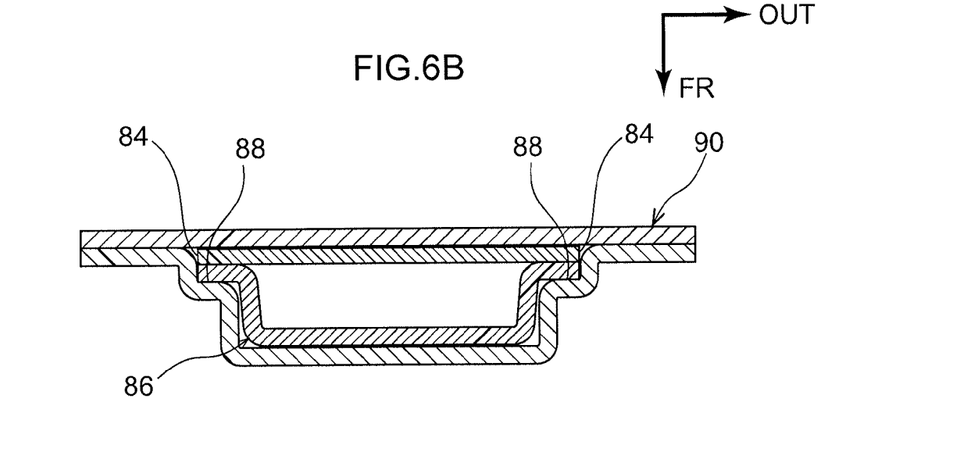
FIG. 6B is a cross-section illustrating a cross-section of the members including the hood lock device, taken along line 6B-6B illustrated in FIG. 6A.

As illustrated in FIG. 6A and FIG. 6B, the hood lock device 82 according to the first modified example includes the hood lock device body 86 provided with tongue shaped guide tabs 84 extending at a vehicle width direction right side and left side respectively, and a lock base 90 formed in a tube shape and provided with the guide grooves 88, in which the guide tabs 84 are disposed. A specific clearance is provided between the hood lock device body 86 and the lock base 90 in a state in which the hood lock device body 86 is inserted into the lock base 90. Moreover, in the lock base 90, a fixing piece 92 that configures part of the fixing device 18 and that is formed in a substantially L-shape as viewed from the front of the vehicle is supported so as to be capable of swinging about the support pin 70. Note that members and portions that have the same functions as in the exemplary embodiment described above are allocated the same reference numerals as in the exemplary embodiment described above, and explanation thereof is omitted.

Figure 7A:
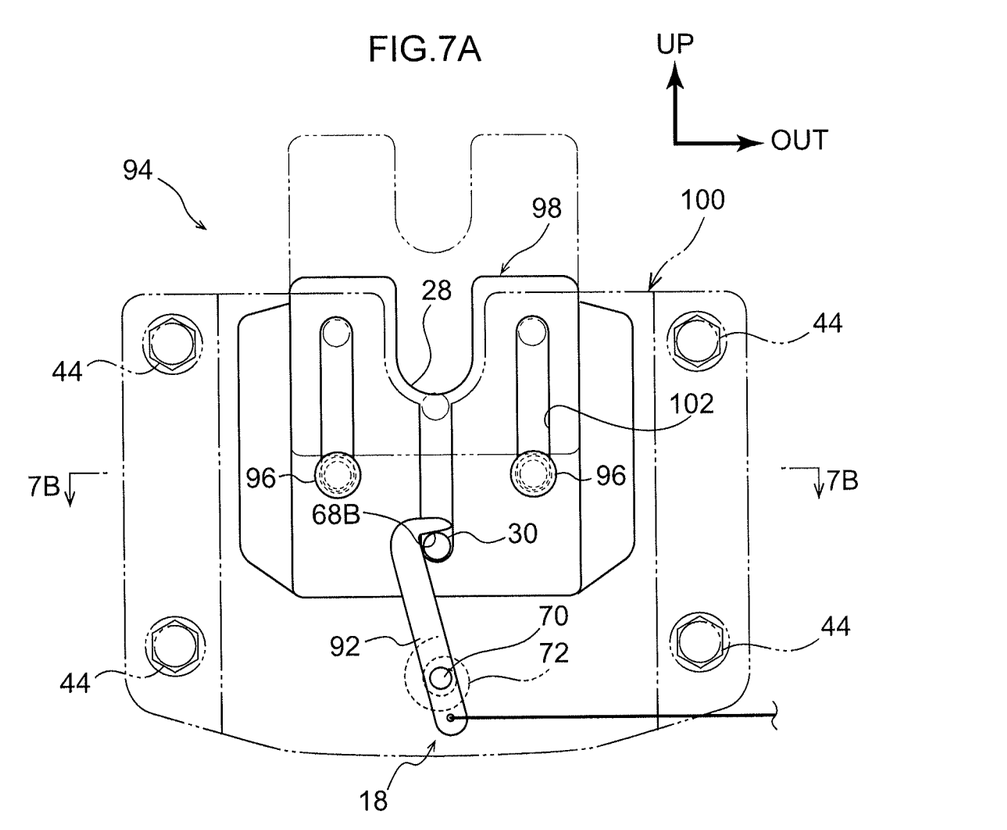
FIG. 7A is an enlarged front view illustrating members including a hood lock device according to a second modified example.

As illustrated in FIG. 7A and FIG. 7B, the hood lock device 94 according to the second modified example includes the hood lock device body 98 provided with a pair of guide pins 96 disposed at a separation to each other in the vehicle width direction, and a lock base 100 formed in a tube shape into which the hood lock device body 98 is inserted. The lock base 100 is formed with a pair of the guide holes 102 into which the pair of guide pins 96 described above are inserted, and the guide holes 102 are formed in elongated shapes with their length direction running along the vehicle up-down direction. Moreover, a specific clearance is provided between the hood lock device body 98 and the lock base 100 in a state in which the hood lock device body 98 is inserted into the lock base 100.

Note that in the first and second modified examples described above, explanation has been given regarding examples in which the guide grooves 88 or the guide holes 102 are provided to make the hood lock device body 86, 98 follow the movement of the front hood 12. However, the present invention is not limited thereto. For example, configuration may be made in which a hood lock device body is inserted into a tube shaped lock base serving as a guide portion, and the hood lock device body is made to follow the movement of the front hood 12 by sliding the hood lock device body along an inner peripheral face of the lock base.

Figure 8:
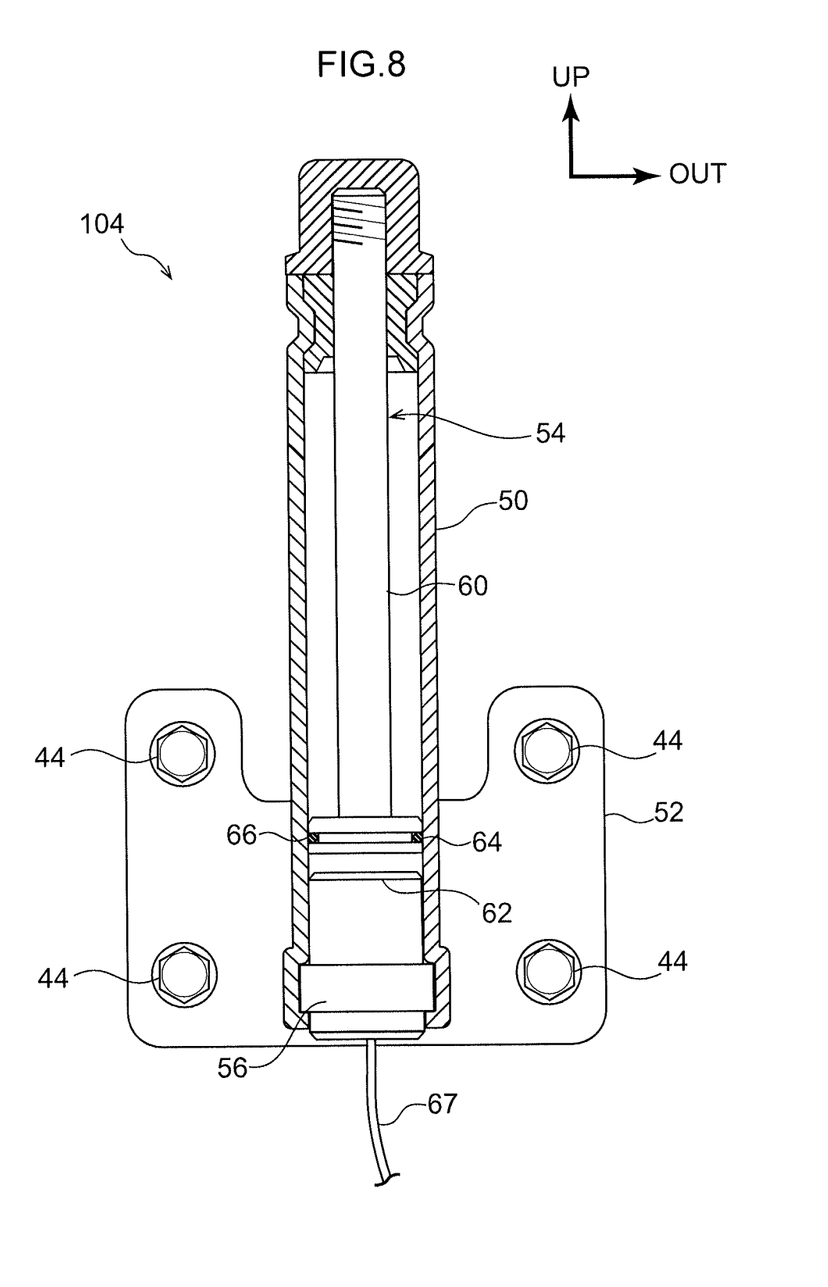
FIG. 8 is an enlarged cross-section corresponding to FIG. 4, illustrating an actuator according to a modified example.

In the exemplary embodiment described above, explanation has been given regarding an example in which the vehicle pop-up hood device 10 is configured employing the actuators 16 of a type in which the cylinder section 50 moves toward the vehicle upper side with respect to the pipe section 54. However, the present invention is not limited thereto. For example, as illustrated in FIG. 8, the vehicle pop-up hood device 10 may be configured employing actuators 104 of a type in which a rod section 103 corresponding to the pipe section 54 moves toward the vehicle upper side with respect to the cylinder section 50. Whether to employ the actuators 16 of a type in which the cylinder section 50 moves toward the vehicle upper side with respect to the pipe section 54, or to employ the actuators 104 of a type in which the rod section 103 moves toward the vehicle upper side with respect to the cylinder section 50, may be decided as appropriate in consideration of, for example, the bending rigidity of the actuators 16, 104 in a popped up state of the front hood 12, namely in an actuation completion state of the actuators 16, 104.

Explanation has been given above regarding an exemplary embodiment of the present invention; however, the present invention is not limited to the above, and obviously various modifications other than those described above may be implemented within a range not departing from the spirit of the present invention.

The invention claimed is:

1. A vehicle pop-up hood device comprising:
a pair of front hood lifting devices that are disposed separated from each other in a vehicle width direction, the front hood lifting devices being disposed at a vehicle lower side of a front end section of a front hood, the pair of front hood lifting devices being actuated to move the front hood from a closed position to a lifted position;
a single hood lock device that is disposed at a vehicle width direction intermediate portion between the pair of front hood lifting devices and is disposed under the front end section of the front hood, the hood lock device including a hood lock device body including an anchored-to portion to which a hood striker attached to the front hood is anchored and a lock portion that retains the hood striker in a state anchored to the anchored-to portion, and a lock base that supports the hood lock device body, and wherein the hood lock device body is configured capable of moving from the closed position to the lifted position together with the front hood;
a fixing device that fixes the hood lock device body to the lock base; and
a fixing release device that, in conjunction with actuation of the front hood lifting devices, releases the fixing of the hood lock device body to the lock base by the fixing device, wherein
the hood lock device body is configured capable of moving from the closed position to the lifted position by sliding along a guide portion,
the guide portion includes a guide groove or a guide hole formed in an elongated hole shape, with which a portion of the hood lock device body engages, and
the portion of the hood lock device body moves along the guide groove or the guide hole.

2. The vehicle pop-up hood device of claim 1, wherein the hood lock device body is configured capable of moving from the closed position to the lifted position by swinging about a specific axis.

3. The vehicle pop-up hood device of claim 1, wherein:
the hood lock device body includes a guide tab respectively extending toward a vehicle width direction right side and a vehicle width direction left side;
the hood lock device body is inserted into the lock base that is formed in a tube shape and that includes the guide groove inside which the guide tab is disposed; and
a clearance is provided between the hood lock device body and the lock base.

4. The vehicle pop-up hood device of claim 1, wherein:
the hood lock device body includes a pair of guide pins disposed separated from each other in the vehicle width direction;
the hood lock device body is inserted into the lock base that is formed in a tube shape and that includes the guide hole inside which the guide pins are disposed; and
a clearance is provided between the hood lock device body and the lock base.

5. The vehicle pop-up hood device of claim 1, wherein:
the fixing release device is configured including a cable with one end coupled to the fixing device, and a link mechanism that actuates in conjunction with actuation of the front hood lifting devices and to which another end of the cable is coupled; and
the cable is configured so as not to be pulled by more than a specific stroke length by the link mechanism.

6. The vehicle pop-up hood device of claim 5, wherein:
the link mechanism includes a link piece that is supported so as to be capable of swinging, and to which the other end of the cable is coupled; and
a portion of the front hood lifting devices that moves toward a vehicle upper side presses a portion of the link piece so as to swing the link piece and pull the cable.

7. The vehicle pop-up hood device of claim 6, wherein, when the portion of the front hood lifting devices has moved a specific distance toward the vehicle upper side, the portion of the front hood lifting devices separates from the link piece.

8. The vehicle pop-up hood device of claim 1, wherein:
in a state in which the front hood is positioned at the closed position, the front hood and the pair of front hood lifting devices are separated from each other; and
the fixing of the hood lock device body to the lock base by the fixing device is released before the front hood lifting devices contact the front hood.

9. The vehicle pop-up hood device of claim 1, wherein
an auxiliary lever is attached to the hood lock device body to suppress unintentional opening of the front hood by anchoring an auxiliary hook provided to the front hood.

10. The vehicle pop-up hood device of claim 1, wherein
the front hood lifting devices are each configured by an actuator of a type in which a cylinder section inside which a pipe section is disposed moves toward a vehicle upper side with respect to the pipe section, or by an actuator of a type in which a rod section inserted into a cylinder section moves toward the vehicle upper side with respect to the cylinder section.

\* \* \* \* \*